United States Patent [19]

Brandes et al.

[11] Patent Number: 4,831,004
[45] Date of Patent: May 16, 1989

[54] IMPREGNATED ALUMINA-CONTAINING MATERIAL

[75] Inventors: Karlheinz K. Brandes, Bartlesville, Okla.; Simon G. Kukes, Naperville, Ill.; Thomas Davis, Bartlesville, Okla.

[73] Assignee: Phillips Petroleum Company, Bartlesville, Okla.

[21] Appl. No.: 212,843

[22] Filed: Jun. 29, 1988

Related U.S. Application Data

[62] Division of Ser. No. 52,097, May 20, 1987, Pat. No. 4,778,588.

[51] Int. Cl.$^4$ .................. B01J 23/28; B01J 23/74; B01J 27/053
[52] U.S. Cl. .................. 502/220; 502/216; 502/217; 502/218; 502/219; 502/221; 502/222
[58] Field of Search .............. 502/216, 217, 218, 219, 502/220, 221, 222

[56] References Cited

U.S. PATENT DOCUMENTS

| | | | |
|---|---|---|---|
| 3,725,531 | 4/1973 | Pearson et al. | 423/244 |
| 4,024,079 | 5/1977 | Okuyama et al. | 502/216 |
| 4,151,072 | 4/1979 | Nowack et al. | 208/251 R |
| 4,201,662 | 5/1980 | Horton | 208/228 |
| 4,287,049 | 9/1981 | Tabler et al. | 208/251 H |
| 4,411,771 | 10/1983 | Bambrick et al. | 208/112 |
| 4,495,308 | 1/1985 | Gibson | 208/216 PP |
| 4,499,205 | 2/1985 | Masuda | 502/303 |
| 4,568,664 | 2/1986 | Goodboy | 502/330 |
| 4,570,025 | 2/1986 | Nowack et al. | 585/259 |

OTHER PUBLICATIONS

Product Data "S-100 Activated Alumina for Claus Catalysis", Alcoa Chemicals Division, 1984.
Technical Bulletins SC:175-80 and SC:462-80, Shell Chemical Company, 1980.
Technical Data "Actispheres-Protection Upper Layer", Procatalyse, 1985.

Primary Examiner—W. J. Shine
Attorney, Agent, or Firm—K. K. Brandes

[57] ABSTRACT

A composition of matter is prepared by a process comprising the steps of impregnating a alumina-containing support material with a thiosulfate (preferably ammonium thiosulfate), drying the thus impregnated material, impregnating the dried material with a transition metal compound, drying and calcining the transition metal impregnated material. This composition of matter is used as catalyst composition for hydrogenating unsaturated hydrocarbon compounds, and as catalyst composition for hydrotreating hydrocarbon-containing feed streams (in particular heavy oils) which contain metal and sulfur compounds as impurities.

In another embodiment, a hydrotreating process comprises contacting hydrocarbon-containing feed stream (in particular heavy oils), which contains compounds of sulfur and metals, in the presence of a fixed catalyst bed comprising (X) at least one layer of impregnated substantially spherical alumina-containing particles, which have been prepared by a process comprising the steps of impregnating a specific starting material with $(NH_4)_2S_2O_3$ and then heating the thus impregnated material at about 500°–900° C. for improved crush strength retention. In a preferred embodiment, the fixed catalyst bed further comprises at least one layer (Y) of catalyst particles comprising a refractory inorganic carrier and at least one hydrogenation promoter. A composition of matter comprising the impregnated, spherical alumina-containing particles described above, and a process for preparing them are also provided.

49 Claims, 4 Drawing Sheets

IMPREGNATED ALUMINA-CONTAINING MATERIAL

This application is a division of Ser. No. 052,097; filed May 20, 1987; now U.S. Pat. No. 4,778,588.

BACKGROUND OF THE INVENTION

In one aspect, this invention relates to catalytic hydrotreating of liquid hydrocarbon-containing feed stream, in particular heavy petroleum fractions. In another aspect, this invention relates to catalytic hydrogenation of unsaturated hydrocarbons. In a further aspect, this invention relates to new compositions of matter, suitable as catalysts for hydrotreating and hydrogenation reactions.

The use of alumina, either unpromoted or promoted with transition metal compounds, for hydrotreating (e.g., demetallizing, desulfurizing, denitrogenating, hydrocracking, hydrogenating) liquid hydrocarbon feed streams, which contain metal, sulfur and nitrogen impurities, is well known. The removal of these impurities is desirable because they can poison catalysts in downstream operations such as catalytic cracking, and can cause pollution problems when hydrocarbon products from these feed streams are used as fuels in combustion processes. It is also known to use alumina-supported transition metal catalysts for hydrogenation of unsaturated hydrocarbons (such as olefins or cycloolefins). However, there is an ever present need to develop new alumina-containing materials having improved hydrotreating/hydrogenating activity and/or having other improved properties, such as higher crush strength.

SUMMARY OF THE INVENTION

It is an object of this invention to provide effective hydrotreating catalyst compositions. It is another object of this invention to provide processes for preparing new effective hydrotreating catalyst compositions. It is still another objective of this invention, to provide a process for hydrogenating unsaturated hydrocarbons in the presence of a new, effective catalyst composition. It is a still further object of this invention to provide hydrotreating processes for the removal of sulfur, nickel, vanadium and other impurities from hydrocarbon-containing oils, in the presence of new effective hydrotreating catalyst compositions. Other objects and advantages will be apparent from the detailed description and the appended claims.

In accordance with this invention, there are provided a process and a composition of matter (suitable as a catalyst composition) comprising alumina and at least one compound of at least one transition metal belonging to Groups VIB, VIIB, VIII or IB of the Periodic Table (as defined in Webster's Collegiate Dictionary, 1977), said composition of matter being prepared by the process comprising the steps of:

(A) impregnating a support material comprising (preferably consisting essentially of) alumina with a solution comprising (preferably consisting essentially of) water and at least one dissolved thiosulfate and/or compound (preferably Group IA and/or Group IIA metal thiosulfate and/or ammonium thiosulfate; more preferably $(NH_4)_2S_2O_3$);

(B) heating the material obtained in step (A) under such conditions as to at least partially dry said material obtained in step (A);

(C) impregnating the at least partially dried material obtained in step (B) with a solution comprising (preferably consisting essentially of) a liquid solvent (preferably water) and at least one dissolved compound of at least one metal selected from the group consisting of transition metals belonging to Group VB, Group VIB, Group VIIB, Group VIII and Group IB of the Periodic Table of Elements (preferably at least of Mo, Ni and Co);

(D) heating the material obtained in step (C) at a first temperature so as to at least partially dry said material obtained in step (C);

(E) heating (i.e., calcining) the at least partially dried material obtained in step (D) at a second temperature, which is higher than said first temperature, so as to activate said at least partially dried material obtained in step (D).

Also in accordance with this invention, a feed stream which comprises at least one unsaturated hydrocarbon compound (preferably alkene, cycloalkene, alkadiene; cycloalkadiene, alkatriene, cycloalkatriene, alkyne) is contacted with a free hydrogen-containing gas (preferably substantially pure $H_2$) and the composition of matter (catalyst composition) prepared by the process comprising steps (A) through (E), under such hydrogenating conditions as to obtain a product stream comprising at least one product compound containing more hydrogen than said at least one unsaturated hydrocarbon compound from which it is formed.

Further in accordance with this invention, a substantially liquid (i.e., liquid at the hydrotreating conditions) hydrocarbon-containing feed stream, which also contains compounds of at least one metal (preferably nickel and/or vanadium) and of sulfur as impurities, is simultaneously contacted with a free hydrogen-containing gas (preferably consisting essentially of $H_2$) and the composition of matter prepared by the process comprising steps (A) through (E), under such hydrotreating conditions as to produce a hydrocarbon-containing stream having reduced levels of metal and sulfur.

Still further in accordance with this invention, there are provided a process and a composition of matter (suitable as a material for a layer in a fixed hydrotreating bed) comprising (preferably consisting essentially of) impregnated, substantially spherical alumina-containing particles, prepared by the process comprising the steps of:

(a) impregnating (i) a starting material of substantially spherical alumina-containing particles which have an initial average particle size (diameter) of at least about 0.05 inch, an initial surface area (determined by the BET/$N_2$ method; ASTM D3037) of at least about 20 $m^2/g$, an initial pore volume (determined by mercury intrusion porosimetry at a pressure ranging from 0 to 50,000 psig) of at least about 0.1 cc/g, and an initial $Al_2O_3$ content of at least about 80 weight-%, with (ii) a solution (preferably aqueous) comprising dissolved ammonium thiosulfate; and (b) heating the material obtained in step (a) at a temperature in the range of from about 500° to about 900° C. for a period of time of at least about 10 minutes (preferably in the range of from about 10 minutes to 20 hours), under such heating conditions as to obtain a material having a higher crush strength than said starting material (wherein the crush strength is measured after exposure of each of the two materials for about 100 hours to a liquid hydrocarbon-containing stream which contains at least about 0.5 weight-% sulfur, under hydrotreating conditions at about 2250 psig total pressure, about 400 psig partial pressure of steam and about 700° F.).

Preferably a drying step (a1) after step (a) is carried out, so as to remove at least a portion of water from the material obtained in step (a). In this preferred embodiment, step (b) is carried out with the material obtained in step (a1). Also preferably, the starting material used in step (a) has a normalized crush strength of at least about 100 lb per inch diameter per particle, and an initial Na content of less than about 3.0 weight-%.

Still further in accordance with this invention, a hydrotreating process is provided wherein a substantially liquid hydrocarbon containing feed stream, which also contains compounds of at least one metal (preferably Ni and/or V) and of sulfur as impurities, is simultaneously contacted with a free hydrogen containing gas (preferably substantially pure $H_2$) and a fixed catalyst bed comprising (Y) at least one layer of the composition of matter prepared by the process comprising steps (a) and (b), and optionally also (a1), under such hydrotreating conditions as to produce a hydrocarbon-containing stream having reduced levels of metal (preferably Ni and/or V) and sulfur.

In a particularly preferred embodiment, said fixed catalyst bed additionally comprises (Y) at least one layer of catalyst particles [i.e., hydrotreating catalyst particles; different from the particles in layer (X)] comprising a refractory inorganic carrier (preferably alumina) and at least one (i.e., one or a mixture of two or more) hydrogenation promoter selected from the group consisting of transition metals of Groups IIIB, IVB, VB, VIB, VIIB, VIII, IB and IIB of the Periodic Table (as defined in Webster's New Collegiate Dictionary, 1977) and compounds of these metals (preferably Y, La, Ce, Ti, Zr, Cr, Mo, W, Mn, Re, Ni, Co and Cu, and compounds thereof).

In another preferred embodiment of this invention, a fixed catalyst bed (preferably a hydrotreating catalyst bed) is provided comprising (X) at least one catalyst bed layer of impregnated, substantially spherical alumina-containing particles of this invention, having been prepared by the process composing steps (a) and (b), and optionally also step (a1), as described above; and (Y) at least one catalyst bed layer of catalyst particles [preferably hydrotreating catalyst particles; different from the particles in layer (X)] comprising a refractory inorganic carrier material and a hydrogenation promoter, as defined immediately above.

In a further preferred embodiment of this invention, said impregnated, substantially spherical alumina-containing particles, which can be used in catalyst bed layer (X), also contain at least one compound of at least one element selected from the group consisting of Y, La, Ce, Ti, Zr, Cr, Mo, W, Mn, Re, Ni, Co, Cu, Zn and P, preferably oxide and/or sulfide of Mo and/or Co and/or Ni (more preferably containing about 0.1–2.0 weight-% Mo) as hydrotreating promoters. In a more preferred embodiment, the impregnating solution used in step (a) comprises at least one compound of at least one of the elements listed immediately above.

DETAILED DESCRIPTION OF THE INVENTION

Figure 1:
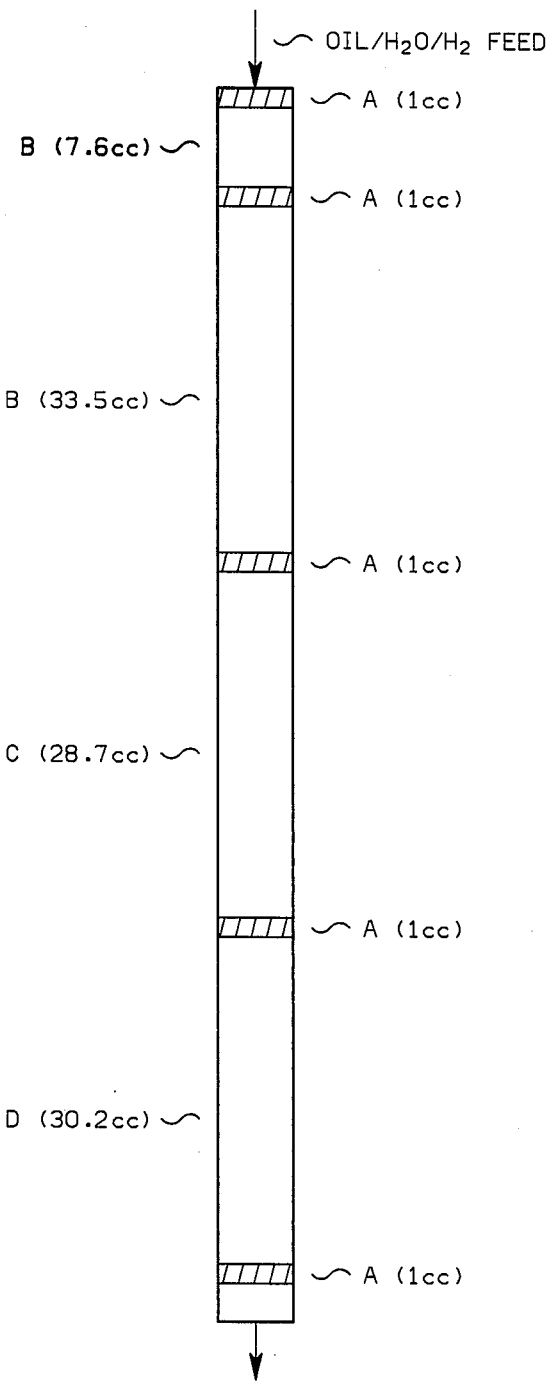
FIG. 1 shows the arrangement of a fixed multi-layer catalyst bed used for testing catalysts in hydrotreating processes.

Composition Prepared by Process Comprising Steps (A) Through (E).

The alumina support material used in step (A) of the preparation of the composition of matter (catalyst composition) of this invention can be any alumina or partially hydrated forms thereof, preferably substantially pure alumina. Generally, the surface area (determined by the BET/$N_2$ method; ASTM D3037) of said support material is about 20 to about 350 $m^2/g$ and the pore volume (measured by mercury intrusion porosimetry) is about 0.2 to about 2.0 cc/g. The support material may contain transition metals such as those of Groups IB, IIB, IIIB, IVB, VB, VIB, VIIB and VIII of the Periodic Table, e.g., Mo, Ni, Co or compounds thereof. At present, it is not preferred to have more than only traces of these transition metals present in the alumina-containing support material i.e., the level of these transition metals should be less than about 0.2 weight-%, based on the weight of the entire alumina-containing material (before impregnation).

It is within the scope of this invention (yet presently not preferred) to employ mixtures of alumina with other inorganic refractory materials such as silica, aluminosilicates (such as zeolites), magnesia, titania, zirconia, aluminum phosphate, zirconium phosphate, alumina-silica, alumina-titania, zeolite-silica and the like. Generally, the above-mentioned other refractory materials will not exceed about 10 weight-%, based on the weight of the alumina-containing support material. The alumina support material can be spherical (presently preferred diameter of alumina particles: about 0.2–20 mm, preferably about 0.5–3 mm) or can have cyclindrical, trilobal or quadtrilobal form or can be irregularly shaped.

Any suitable thiosulfate compound can be used as solute in the solution employed in step (A). Non-limiting examples of such thiosulfates are $(NH_4)_2S_2O_3$, $NaHS_2O_3$, $Na_2S_2$ and other alkali metal thiosulfates, $MgS_2O_3$, $CaS_2O_3$ and other alkaline earth metal thiosulfates, preferably $(NH_4)_2S_2O_3$. It is understood that these thiosulfates can be applied as hydrates. It is also understood that the ammonium group in ammonium thiosulfate can be alkyl-substituted (presently not preferred).

The concentration of the thiosulfate compound in the aqueous impregnating solution used in steps (A) generally is in the range of from about 1 to about 200 grams per liter (g/l) solution, preferably from about 10 to about 100 g/l, more preferably from about 30 to about 80 g/l. The weight ratio of the alumina-containing support material to the thiosulfate-containing impregnating solution employed in steps (A) generally is in the range of from about 1:20 to about 5:1 (depending on the concentration of the thiosulfate-containing solution), preferably from about 1:5 to about 1:1. The impregnation time in step (A) should be long enough to ensure that the alumina-containing support materials are substantially penetrated by the impregating solution. Generally, the impregnation time is in the range of from about 0.5 to about 60 minutes, preferably from about 1 to about 10 minutes. The temperature during impregnation in step A can be ambient (e.g., about 60°–75° F.) or higher (e.g., about 80°–200° F.).

Heating steps (b) and (D) are generally carried out in an oxidizing gas atmosphere (preferably in air) or an inert gas atmosphere, at a temperature ranging from about 40° C. to about 300° C. so as to remove the greatest portion of water from the mixture obtained in the preceding step. The preferred temperature for step (B) is in the range of from about 80° C. to about 300° C.; the preferred temperature for step (D) is in the range of from about 50° C. to about 200° C. Vacuum conditions may be employed but are presently not preferred. The substantially dried material obtained in step (B) generally contains less than about 5 weight-% water. The at least partially dried material obtained in step (D) generally contains less than 20 weight-% water. The rate of heating is controlled so as to avoid surges of water vapor that can cause the impregnating solution to splatter and to excessively accumulate in certain surface regions of the solid support material. Depending on the heating temperature and specific heating conditions (such as extent of gas movement and thickness of the solid layer to be dried), the heating time ranges generally from about 0.5 hour to about 100 hours, preferably from about 1 hour to about 30 hours.

Impregnating step (C) can be carried out in any suitable manner with any suitable dissolved transition metal compound that is at least partially soluble in the solvent of the solution. The solvent can be an organic solvent such as methanol, ethanol, higher alcohols, carboxylic acids such as acetic acid, acetone, esters and similar polar liquids. Preferably the solvent is water. Non-limitative examples of metals contained in said dissolved metal compound are Cr, Mo, W, Re, Co, Ni, Cu and mixtures of two or more; preferably Mo, Co, Ni and mixtures of two or three of these metals. The transition metal compounds can be halides (e.g., chlorides), nitrates, sulfates, bisulfates, bicarbonates, carboxylates (e.g., acetate, oxalate, citrate and the like), coordination complexes (e.g, amino complexes of Ni and Co salts and the like), homoand hetropolyacids and their salts (e.g., ammonium molybdates), and the like. It is understood that these compound can be applied as hydrates, e.g., $Ni(NO_3)_3 \cdot 6H_2O$, $Co(NO_3)_3 \cdot 6H_2O$ and $(NH_4)_2Mo_7O_{24} \cdot 4H_2O$ (all three compounds being presently preferred).

Any suitable concentration of the at least one transition metal compound in the impregating solution of steps (C) and any suitable weight ratio of the at least partially dried material from step (B) to said impregating solution can be applied. This concentration and weight ratio can vary widely, depending on what the desired level of transition metal promoter in the finished catalyst composition is. Generally the combined concentration of all metal compounds in the impregnating solution of step (C) is in the range of from about 0.01 to about 5.0 mol/l, preferably from about 0.05 to about 3.0 mol/l. The weight ratio of the at least partially dried material obtained in step (B) to the impregnating solution generally is in the range of from about 1:100 to about 10:1, preferably from about 1:10 to about 2:1. Other solvents (which may aid in the dissolving of the metal compounds) such as acids (e.g., citric acid, phosphoric acid), borates and phosphates may also be present in the impregnating solution.

Step (C) can be carried out at room temperature (e.g., 60°–75° F.) as at elevated temperatures (e.g., 80°–200° F.), with or without agitation. The at least partially dried material obtained in steps (B) can be soaked with the impregnating solution (with or without agitation) or can be mixed for any suitable time (generally about 1 minute to about 5 hours, preferably about 0.1–2 hours). Excess impregnating solution can be drained. The impregnating solution can also be sprayed onto the at least partially dried material from step (B). Presently, soaking of the material obtained in step (B) with the impregnating solution and subsequent draining of excess solution is preferred.

Even though it is preferred to employ substantially clear aqueous solutions in steps (A) and (C), it is within the scope of this invention to use aqueous solutions having solid particles dispersed therein. In this case, the solutions plus dispersed particles can be used "as is" in steps (A) and (C), or, preferably, the dispersed solid particles are separated from the solutions by any suitable separation means, such as filtration, centrifugation or settling and subsequent draining, before the solutions are used for the impregnation of alumina.

The preferred heating (calcining) conditions in step (E) comprise heating in a non-reducing gas atmosphere, a temperature ranging from about 300° C. to about 700° C. (more preferably from about 400° C. to about 600° C.) and a heating time ranging from about 1 to about 10 hours. Presently preferred specific calcining conditions are described in Example I (Catalyst A). Generally, the heating is carried out in a free oxygen containing atmosphere, preferably air. But other non-reducing gases, e.g., nitrogen, helium, neon, argon, krypton, xenon or mixtures thereof, may also be employed.

The terms "activate" and "activation" as used herein means that the calcined catalyst composition of this invention is a more effective catalyst for either the hydrogenation of unsaturated hydrocarbon compounds and/or for hydrotreating reactions, particularly hydrodemetallization and hydrodesulfurization of liquid hydrocarbon-containing feed streams, than the at least partially dried mixture obtained in preceding step (D). Preferably transition metal compounds contained in the at least partially dried material obtained in step (D) are at least partially converted to metal oxides in step (E).

The calcined composition of matter of this invention obtained in step (E) generally contains from about 0.1 to about 25 weight-% transition metal, and preferably contains from about 0.3 to about 8.0 weight-% transmition metal. The surface area (determined by the BET/$N_2$ method; ASTM D3037) of the calcined catalyst compositions of matter of this invention generally is in the range of from about 20 to about 350 m²/g, preferably in the range of from about 100 to about 250 m²/g. The pore volume (determined by mercury intrusion using an Autopore 9200 instrument of Micromeretics, Norcross, Georgia) generally is in the range of from about 0.2 to about 2.0 cc/g. The compositions of matter of this invention can be spherical or can be compacted into various shapes (e.g., cylindrical, trilobal etc) for convenient shipping and use in fixed catalyst beds.

In one embodiment, the composition of matter (catalyst composition) of this invention obtained in step (E) is presulfided by the additional step (F) of contacting the calcined compositions of matter with at least one suitable sulfur compound under such conditions as to at least partially convert transition metal compounds (preferably oxides) contained in the calcined catalyst composition to transition metal sulfides. This can be accomplished by passing a sulfur-containing oil (preferably gas oil) or solutions of COS or of mercaptans or of organic sulfides, e.g., in hydrocarbon solvents, over the composition of matter at an elevated temperature (e.g., at about 300°–650° F.), generally in the presence of hydrogen gas; or a gaseous mixture of hydrogen and hydrogen sulfide (e.g. at a volume ratio of about 10:1) can be passed over the catalyst composition at an elevated temperature, preferably 1–15 hours at about 400° F. and then 1–15 hours at about 700° F. This presulfiding step is particularly desirable when the composition of matter (catalyst composition) of this invention is used for hydrotreating or hydrocracking of liquid hydrocarbon-containing feed streams.

The composition of matter obtained in step (E) can also be heated in a reducing gas such as $H_2$, CO, methane and the like or gas mixtures containing $H_2$, CO, methane and the like, under such conditions as to at least partially (preferably substantially) convert transition metal compounds to the metallic form (e.g., Ni metal). The reducing treatment is preferably carried before the hydrogenation of unsaturated hydrocarbon compounds.

Hydrogenation of Unsaturated Hydrocarbon Compounds

Any suitable unsaturated hydrocarbon compound possessing at least one C=C double bond (i.e., one, two or more than two C=C bonds), or at least one C≡C triple bond, or both C=C and C≡C bonds can be used as the unsaturated hydrocarbon feed compound in the hydrogenation process of this invention, employing the catalyst composition prepared by the process comprising steps (A) through (E).

The unsaturated hydrocarbon feed compound can be any suitable straight-chain or branched alkene (monoolefin), preferably containing 2–12 carbon atoms per molecule and preferably being either gaseous or liquid at ambient conditions (about 20° C., 1 atm). Non-limiting examples of suitable alkenes are ethylene, propylene, 1-butene, 2-butene, 1-pentene, 2-pentene, 2-methyl-1-butene, 3-methyl-1-butene, 1-hexene, 4-methyl-1-pentene, 2,3-dimethyl-1-butene, 2-ethyl-2-butene, heptenes, octene, nonenes, decenes, undecenes, dodecenes, mixtures thereof.

The unsatured hydrocarbon feed compound can be any suitable straight-chain or alkyl-substituted cycloalkene (cyclomonoolefin), preferably containing 5–12 carbon atoms per molecule and preferably being liquid at ambient conditions. Non-limiting examples of cycloalkenes are cyclopentene, methylcyclopentenes, cyclohexenes, methylcyclohexenes, ethylcyclohexenes, cycloheptenes, cyclooctenes, and cyclononenes, and mixtures thereof. Presently preferred is cyclohexene.

The unsaturated hydrocarbon feed compound can be any suitable straight-chain or branched alkyne (acetylene), preferably containing 2–12 carbon atoms per molecule and preferably being gaseous or liquid at ambient conditions. Non-limiting examples of suitable alkynes are: acetylene, 1-propyne, 1-butyne, 2-butyne, 1-pentyne, 2-methyl-1-butyne, hexynes, heptynes, octynes, nonynes, decynes and mixtures thereof.

The unsaturated hydrocarbon feed compound can be any suitable unsubstituted or alkyl-substituted alkadiene (diolefin), alkatriene (triolefin), cycloalkadiene (cyclodiolefin) and cycloalkatriene (cyclotriolefin), preferably those disclosed in U.S. Pat. No. 4,570,025, herein incorporated by reference.

It is understood that the feed stream may contain any mixture of two or more unsaturated hydrocarbon compounds, such as mixtures of alkenes and cycloalkenes, alkenes and alkadienes, cycloalkenes and cycloalkadienes and the like. It is also understood that the unsaturated hydrocarbon compound can contain substituents such as halogen, hydroxyl group, aldehyde group, carboxyl group, ether group, ester group, phenyl group, alkyl-phenyl groups and the like, as long as these substituents do not adversely affect the hydrogenation process of this invention. Presently these substituents are not preferred.

The feed stream containing at least one unsaturated hydrocarbon compound, the hydrogen containing gas stream and the catalyst composition of this invention [prepared by the process comprising steps (A) through (E)] can be contacted in any suitable manner in the hydrogenation process of this invention. Said two streams can be added separately into a suitable reaction vessel and then contacted in at least partially mixed form with the catalyst composition under suitable reaction (hydrogenating) conditions. Or the two streams can be premixed and then contacted with the catalyst composition under suitable hydrogenation conditions so as to produce a reaction product comprising at least one compound containing fewer C=C and/or C≡C bonds than the feed hydrocarbon compound or, alternatively, no C=C and/or C≡C bonds at all.

The hydrogenting process of this invention can be conducted as a batch process or an a continuous process. In a batch process, the process ingredients are added in any order to a reaction vessel, preferably equipped with agitating and heating means, and the process ingredients are then kept in contact with each other for a certain length of time and under suitable reaction (hydrogenating) conditions so as to produce a product being less unsaturated than the feed or, alternatively, being saturated. In this type of operation, the catalyst can be dispersed in the hydrocarbon containing feed (preferably liquid) and contacted with a free hydrogen containing gas with agitation (e.g., by means of a mechanical mixer or static mixing means); or the feed and the free hydrogen containing gas can be circulated through a fixed bed containing the catalyst composition. In a continuous process, which is presently preferred, the unsaturated hydrocarbon-containing feed stream (preferably liquid) and the free hydrogen containing gas stream can be passed, at least partially mixed, through a fixed bed containing the solid hydrogenation catalyst composition of this invention, under such conditions as will result in a product, as defined above. Optionally, an inert solvent can be present during the batch or continuous process.

Heating of the process ingredients can be such as to accomplish at least partial conversion (preferably exceeding 50%) of the feed. Any suitable temperature that will cause and maintain a controllable reaction can be employed. Any feasible heating means, if necessary, can be utilized. It is within the scope of this invention to preheat one or more of the process ingredients before they are introduced into a reactor. The reaction temperature generally exceeds about 80° C. and preferably ranges from about 100° C. to about 300° C., more preferably from about 150° C. to about 250° C.

The total reaction pressure can be atmospheric (about 15 psia) or higher. The selection of the reaction pressure will greatly depend on the reaction temperature, the feed rates of the liquid feed stream and the hydrogen gas stream, and the specific reactor design. Generally, the total reaction pressure ranges from about 15 to about 5000 psia, preferably about 15 to about 1000 psia, more preferably from about 100 to about 300 psia. Preferably, the reaction pressure is high enough so as to keep the hydrocarbon containing feed stream substantially in the liquid phase.

The reaction time, i.e., the time of intimate, simultaneous contact of all required process ingredients (including catalyst composition), can vary from 1 minute to about 50 hours and will preferably be in the range of about 0.2 to about 1 hours. The actual reaction time will greatly depend on the flow rate of the hydrocarbon feed stream, the flow rate of the free hydrogen containing gas stream, the selection of an effective (yet safe) reaction temperature, the extent of mixing and agitation (if any) during the reaction, and the amount of the catalyst employed.

Any suitable molar ratio of hydrogen to unsaturated feed hydrocarbon can be employed. The amount of hydrogen charged to the reactor is chosen so as to initiate and maintain a suitable, safe rate of reaction under specific reaction conditions. The mol ratio of initially charged hydrogen to the unsaturated feed hydrocarbon (alkene, alkadiene, alkatriene, alkyne, cycloalkene, cycloalkadiene or cycloalkatriene) can vary over a wide range, such as about 0.05:1 to about 200:1, but will typically be in the range of about 5:1 to about 20:1 in a continuous flow system.

The formed reaction products can be recovered for the reaction mixture, and the hydrocarbon product compounds can be separated from each other by any suitable separation means such as fractional distillation, crystallization, extraction with a suitable solvent, and the like. Unreacted process ingredients can be recycled to the reaction zone with added fresh process ingredients. It is generally expected that alkenes are substantially converted to alkanes, cycloalkenes to cycloalkanes, alkadienes to alkenes, cycloalkadienes to cycloalkenes, alkynes to alkenes and/or alkane and the like. Preferably, in the hydrogenation process of this invention, cyclohexene is substantially converted to cyclohexane.

Hydrotreating Process

The composition of matter of this invention can be used as a catalyst composition for a variety of hydrocarbon conversion reactions. In one preferred embodiment of this invention, the catalyst composition of this invention is used as a catalyst for hydrotreating substantially liquid hydrocarbon-containing feed streams, which also contain compounds of sulfur, nickel and/or vanadium as impurities, and generally also asphaltenes, coke precursors (measured as Ramsbottom carbon residue) and nitrogen compounds. Suitable hydrocarbon containing feed streams include crude oil and heavy fraction thereof, heavy oil extracts, liquid coal pyrolyzates, heavy liquids from coal liquification, heavy liquids obtained from tar sands, shale oil and heavy shale oil fractions. The catalyst compositions are particularly suited for treating heavy oil residua, which generally have an initial boiling point in excess of about 400° F., preferably in excess of about 600° F., contain about 5-1000 ppmw (parts by weight per million by weight of feed stream) of vanadium, about 3-500 ppmw of nickel, about 0.3-5 weight-% sulfur and about 0.2-2 weight-% nitrogen, and have an $API_{60}$ gravity of about 5-30.

The hydrotreating process of this invention employing the catalyst composition of this invention is carried out in any apparatus wherein an intimate contact of the catalyst composition with said hydrocarbon-containing feed stream and a free hydrogen containing gas is achieved, under such conditions as to produce a hydrocarbon-containing product having a reduced levels of nickel and/or vanadium and sulfur. Generally, a lower level of nitrogen and Ramsbottom carbon residue and a higher value of $API_{60}$ gravity are also attained in this hydrotreating process. The hydrotreating process can be carried out using a fixed catalyst bed (presently preferred) or a fluidized catalyst bed or a moving catalyst bed or an agitated slurry of the catalyst in the oil feed (hydrovisbreaking operation). The hydrotreating process can be carried out as a batch process or, preferably, as a continuous process, more preferably in a tubular reactor containing one or more fixed catalyst beds or in a plurality of fixed bed reactors in parallel or in series.

The catayst composition of this invention can be used in said hydrotreating process alone in a reactor or may be used in combination with essentially unpromoted refractory materials such as alumina, silica, titania, magnesia, silicates, metal aluminates, alumino-silicates (e.g., zeolites), metal phosphates and mixtures of these materials. Alternating layers of the refractory material and of the catalyst composition can be used, or the catalyst composition can be mixed with the refractory material. Use of the refractory material with the catalyst composition provides for better dispersion of the hydrocarbon-containing feed stream. Also, other catalysts such as known hydrogenation and desulfurization catalysts (e.g., $NiO/MoO_3$, $CoO/MoO_3$ and $NiO/CoO/MoO_3$ on silica or titania) may be used with the catalyst composition of this invention to achieve simultaneous demetallization, desulfurization, denitrogenation, hydrogenation and hydrocracking, if desired. In one embodiment of said hydrocarbon hydrotreating process, the catalyst composition has been presulfided, as described above, before being used.

Any suitable contact (reaction) time between the catalyst composition, the hydrocarbon-containing feed stream and hydrogen gas can be utilized. In general, the reaction time will range from about 0.05 hours to about 10 hours. Preferably, the reaction time will range from about 0.4 to about 5 hours. Thus, the flow rate of the hydrocarbon-containing feed stream should be such that the time required for the passage of the mixture through the reactor (residence time) will preferably be in the range of about 0.4 to about 5 hours. In a continuous fixed bed operation, this generally requires a liquid hourly space velocity (LHSV) in the range of about 0.10 to about 20 cc of feed per cc of catalyst per hour, preferably from about 0.2 to about 2.5 cc/cc/hr.

The hydrotreating process employing the catalyst composition of the present invention can be carried out at any suitable temperature. The temperature will generally be in the range of about 250° C. to about 550° C. and will preferably be in the range of about 350° C. to about 450° C. Higher temperatures do improve the removal of metals, but temperatures which will have adverse effects on the hydrocarbon-containing feed stream, such as excessive coking, will usually be avoided. Lower temperatures can generally be used for lighter feeds.

Any suitable pressure may be utilized in the hydrotreating process of this invention. The reaction pressure will generally be in the range of about atmospheric pressure (0 psig) to up to about 5,000 psig. Preferably, the pressure will be in the range of about 100 to about 2500 psig. Higher pressures tend to reduce coke formation but operating at high pressure may be undesirable for safety and economic reasons.

Any suitable quantity of hydrogen can be added to the hydrotreating process. The quantity of hydrogen used to contact the hydrocarbon containing feed stock will generally be in the range of about 100 to about 10,000 standard cubic feed $H_2$ per barrel of the hydrocarbon containing feed stream and will more preferably be in the range of about 1000 to about 6000 standard cubic feed $H_2$ per barrel of the hydrocarbon containing feed stream.

In general, the catalyst composition is utilized primarily for demetallization until a satisfactory level of metals (Ni, V) removal is no longer achieved. Catalyst deactivation generally results from the coating of the catalyst composition with coke and metals removed from the feed. It is possible to remove the metals from the catalyst. But it is generally contemplated that once the removal of metals falls below a desired level, the spent (deactivated) catalyst will simply be replaced by fresh catalyst.

The time in which the catalyst composition of this invention will maintain its activity for removal of metals and sulfur will depend upon the metals concentration in the hydrocarbon containing feed streams being treated. Generally the catalyst composition can be used for a period of time long enough to accumulate about 20-200 weight-% of metals, mostly Ni and V, based on the initial weight of the catalyst composition, from the hydrocarbon containing feed. In other words, the weight of the spent catalyst composition will be about 20-200% higher than the weight of the fresh catalyst composition.

Generally, at least a portion of the hydrotreated product stream having reduced metal and sulfur contents is subsequently cracked in a cracking reactor, e.g. in a fluidized catalytic cracking unit, under such conditions as to produce lower boiling hydrocarbon materials (i.e., having a lower boiling range at 1 atm. than the feed hydrocarbons) suitable for use as gasoline, diesel fuel, lubricating oils and other useful products. It is within the scope of this invention to hydrotreat said product stream having reduced metal and sulfur contents in one or more processes using different catalyst compositions, such as alumina-supported $NiO/MoO_3$ or $CoO/MoO_3$ catalysts, for further removal of sulfur and other impurities, before the product stream is introduced into the cracking reactor.

A further embodiment of this invention is a hydrofining process comprising the step of introducing at least one thermally decomposable metal compound into the hydrocarbon containing feed stream prior to its being contacted with the catalyst composition of this invention. The metal in the decomposable metal compound is selected from the group consisting of the metals of Group IV-B, Group V-B, Group VI-B, Group VII-B, Group VIII and Group IB of the Periodic Table of Elements. Preferred metals are molybdenum, tungsten, manganese, chromium, zirconium and copper. Molybdenum is a particularly preferred metal which may be introduced as a carbonyl, acetylacetonate, carboxylate having 1-12 C atoms per molecule (e.g., acetate, octoate, oxalate), naphthenate, mercaptide, dithiophosphate or dithiocarbamate. Molybdenum hexacarbonyl, molybdenum dithiophosphate and molybdenum dithiocarbamate are particularly preferred additives. The life of the catalyst composition and the efficiency of the demetallization process is improved by introducing at least one of the above-cited decomposable metal compounds into the hydrocarbon-containing feed, which also contains metal such as nickel and vanadium. These additives can be added continuously or intermittently and are preferably added at a time when the catalyst composition of this invention has been partially deactivated so as to extend its life.

Any suitable concentration of these additives may be added to the hydrocarbon-containing feed stream. In general, a sufficient quantity of the additive will be added to the hydrocarbon-containing feed stream to result in a concentration of the metal (preferably molybdenum) in said decomposable compounds ranging from about 1 to about 1000 parts per million and more preferably in the range of about 5 to about 100 parts per million in the feed stream.

Impregnated, Substantially Spherical Alumina-Containing Particles

Any suitable substantially spherical alumina-containing particles which have the following initial parameters can be used as said starting material for step (a): average particle diameter of at least about 0.5 inch, preferably in the range of from about 0.5 to about 1.5 inch, more preferably from about 0.1 to about 1.0 inch; surface area (determined by the $BET/N_2$ method; ASTM D3037) of at least about 20 $m^2/g$, preferably in the range of from about 40 to about 600 $m^2/g$, more preferably in the range of from 100 to about 400 $m^2/g$; a pore volume, as determined by mercury intrusion porosimetry (carried out at room temperature and a mercury pressure varying from 0 psi to about 60,000 psi, using an Autopore 9200 instrument of Micromeritics, Norcross, GA), of at least about 0.1 cc/g, preferably in the range of from about 0.2 to about 1.0 cc/g., more preferably from about 0.3 to about 0.7 cc/g; and content of alumina, which generally is a mixture of gamma-alumina and amorphous alumina, of at least about 80 weight-% $Al_2O_3$, preferably in the range of from about 90 to about 99 weight-% $Al_2O_3$, more preferably from about 93 to about 98 weight-% $Al_2O_3$. The preferred starting material has a normalized crush strength per particle, determined as side plate crush strength by means of a mechanical force gauge, such as the one described in Example I, of at least 100 lb. per inch diameter per particle, more preferably in the range of from about 100 to about 400 lb. per inch diameter per particle; and a Na content of less than about 3.0 weight-%, more preferably below about 2.0 weight-% Na, most preferably below about 0.5 weight-% Na. A presently particularly preferred starting material is a commercially available spherical, alumina-containing Claus catalyst material that is marketed by the Alumina Company of America, Pittsburgh, PA under the product designation of S-100 (see Example VI).

Preparation step (a) as described above, can be carried out in any suitable manner. The solvent in the impregnating solution used in step (a) generally comprises water, and preferably consists essentially of water. Suitable solvents which can be used besides water are alcohols such as methanol, ethanol, ethylene glycol and the like, acetone, esters such as ethyl acetate, and the like.

However, these non-aqueous solvents are presently not preferred. The concentration of ammonium thiosulfate in the impregnating solution of step (a) can be in the range of from about 0.05 to about 5 mol/l, preferably in the range of from about 0.1 to about 1.0 mol/l (i.e., mols $(NH_4)_2S_2O_3$ per liter solution).

The impregnation of the alumina-containing starting material with the impregnating solution can be carried out in any suitable manner. Preferably the starting material is soaked with the $(NH_4)_2S_2O_3$-containing impregnating solution, more preferably with agitation such as mechanical stirring, for a period of time long enough (preferably about 0.2–2 hour) to allow dissolved ammonium thiosulfate to penetrate into the substantially spherical, alumina-containing particles of the starting material, more preferably to the core of these particles. Any suitable weight ratio of said starting material to the impregnating solution can be employed. Preferably, the weight ratio of said starting material to said impregnating solution will be in the range of from about 0.1:1 to about 2.0:1, more preferably from about 0.3:1 to about 1.2:1. Even though presently not preferred, other impregnating methods can be applied, such as spraying of the $(NH_4)_2S_2O_3$-containing impregnating solution onto the substantially spherical, alumina-containing particles of the starting material.

Even though the material obtained in step (a) can be directly processed in step (b), it is presently preferred to substantially dry the impregnated material obtained in step (a) in drying step (a1). The drying step (a1) is generally carried out in air or an inert gas, at a temperature ranging from about 25° C. to about 200° C. (preferably 50°–100° C.) so as to remove the greatest portion of water from the mixture obtained in step (b). Vacuum conditions may be employed but are presently not preferred. The at least partially dried mixture generally contains less than about 20 weight-% water. The rate of drying is controlled so as to avoid surges of water vapor that can cause the impregnating solution to splatter and can cause the particles to crack. Depending on the drying temperature and specific drying conditions (such as extent of air movement; thickness of the solid layer to be dried), the drying time ranges generally from about 0.5 hour to about 100 hours, preferably from about 1 hour to about 30 hours.

The impregnated alumina-containing material obtained in step (a), or alternatively step (a1), is heated (calcined) at a temperature in the range of from about 500 to about 900° C., preferably from about 550 to about 800° C., more preferably from about 600 to about 750° C. The heating time is at least 10 minutes, preferably in the range of from about 10 minutes to 20 hours, more preferably from about 0.5 to about 10 hours. The pressure can be atmospheric (preferred) or subatmospheric or superatmospheric. The heating process can be carried out in a free oxygen containing gas atmosphere, such as air, or in an inert or in a reducing gas atmosphere. Presently, heating in an $O_2$-containing gas is preferred. The gas atmosphere may contain water vapor, but the amount of water vapor should be minimized to less than about 10 volume percent.

Generally the above-described heating (calcining) of the impregnated spherical, alumina-containing material results in a tolerable decrease in surface area, in a slight increase in total pore volume, but in a substantial increase of the pore volume in pores having a pore diameter in the 40–200 Angstroms (A) range. Preferably, the impregnated, substantially spherical alumina-containing particles obtained by the preparation process of this invention have a pore volume of pores in the 40–200 A pore diameter range in excess of about 50%, more preferably from about 50 to about 90% of the total pore volume. Preferably, the total BET/$N_2$ surface area of the impregnated, substantially spherical particles of this invention is in the range of from about 50 to about 300 m$^2$/g, and the total pore volume (determined by mercury porosimetry, discussed above) is in the range of from about 0.3 to about 0.8 cc/g.

The crush strength of the impregnated, substantially spherical alumina-containing particles of this invention is preferably measured after they have been used in a hydrotreating process in the presence of water and sulfur compounds, as has been described above and also in Example V, so as to determine the retention of initial crush strength under these severe hydrotreating conditions (about 2250 psi total pressure, about 400 psi partial pressure of steam, about 700° F., about 100 hours; with at least about 0.5 weight-% sulfur in the hydrocarbon-containing feed). It is believed that the combination of hydrogen, steam and sulfur compounds (resulting in $H_2S$ generation under catalytic hydrotreating conditions) is particularly detrimental to the crush strength of these particles. The thus determined crush strength generally exceeds 150 lb. per inch diameter per particle and preferably is in the range of about 150 to about 350 lb./inch/particle.

The impregnated, substantially spherical alumina-containing particles of this invention can be promoted with at least one element or compound at least one element (i.e., one or mixture of two or more) selected from the group consisting of Y, La, Ce, Ti, Zr, Hf, Cr, Mo, W, Mn, Re, Ni, Co, Cu, Zn, P (as phosphite and/or phosphate), preferably Mo, Ni and Co, more preferably Mo. The total promoter level generally is relatively low and suitably ranges from about 0.01 to about 3.0 weight-% of said at least one element (i.e., one element or mixture of two or more elements), preferably from about 0.1 to about 2.0 weight-%, more preferably from about 0.2 to about 1.0 weight-% of said at least one element (most preferably Mo).

Any suitable technique for promoting the particles of this invention can be employed. Preferably the impregnating solution used in step (a) contains one or more of the above-described promoters besides dissolved $(NH_4)_2S_2O_3$. The thus obtained particles, which additionally contain at least one promoter compound, then undergo step (b), optionally after step (a1), as described above. It is, of course, possible (yet presently not preferred) to carry out step (a) without having any transition metal and/or phosphorus promoter compound present in the impregnating solution, and to impregnate the calcined material obtained in step (b) with a solution containing at least one promoter compound, followed by drying and calcining (preferably at about 500°–900° C.) of the thus twice-impregnated material (so as to at least partially convert the at least one transition metal compound to oxides of said metal). Generally the crush strength of the impregnated, substantially spherical alumina-containing particles is not substantially affected by the presence of one or more promoters.

Fixed Catalyst Bed

In accordance with this invention, a fixed catalyst bed, suitable for hydrotreating substantially liquid hydrocarbon-containing feed streams, which also contain sulfur and metal compounds (as has been described earlier for another embodiment of this invention), is provided comprising at least one layer (X) of the impregnated, substantially spherical alumina-containing material of this invention, prepared by the process comprising steps (a), (b), and optionally, (a1).

In a preferred embodiment of this invention, the fixed catalyst bed comprises at least one layer (X), as described above, and also at least one layer (Y) of catalyst particles, different from those in layer (X). The catalyst particles in layer (Y) generally comprise an inorganic refractory carrier. Non-limiting examples of such inorganic refractory carrier materials are those that comprise (preferably consist essentially of) alumina (preferred), aluminum phosphate, silica, titania, zirconia, zirconium phosphate, ceria, boria, magnesia, silica-alumina, titania-silica, titania-alumina. In addition to the carriers, the catalyst particles in catalyst bed layer (Y) comprise at least one promoter selected from compounds of metals of Groups IIIB, IVB, VB, VIB, VIIB, VIII, IB and IIB of the Periodic Table. Presently preferred promoters are compounds of metals selected from the group consisting of Y, La, Ce, Ti, Zr, Cr, Mo, W, Mn, Re, Ni, Co and Cu, more preferably oxides and/or sulfides of these metals, most preferably Mo, Ni, Co, and mixtures of any of these metal oxides and sulfides. Phosphorus compounds of these metals can also be present. Generally the total level of promoter ranges from about 0.5 to about 30 weight-%, preferably from about 1 to about 15 weight-%, based on the elemental metal. Generally the BET/$N_2$ surface area of the particles in layer (Y) is in the range of from about 50 to about 500 $m^2$/g, and their pore volume (measured by mercury porosimetry) is in the range of from about 0.2 to about 2.0 cc/g.

The catalyst particles in layer (Y) can be prepared by any suitable technique such as by impregnation of the carrier (preferably alumina) with one or more solutions containing one or more compounds of the promoter metals (plus, optionally, one or more compounds of phosphorus) and subsequent drying and calcining (this method presently being preferred) as has been described for promoted particles in layer (X); or by coprecipitation e.g., of hydrogels of alumina and promoter metal (e.g., Ni, Co, Mo), followed by drying and calcining. Suitable commerically available catalyst materials for layer (Y) are described in Example V.

Layers (X) and (Y) can be arranged in the fixed catalyst bed of this invention in any suitable manner. In one preferred embodiment, layer (X) is placed as support layer below at least one catalyst layer (Y). In another embodiment, layer (X) is placed as a cover layer on top of at least catalyst layer (Y). In a further embodiment, catalyst layer (Y) is placed between at least two layers (X). In a still further embodiment, in which at least three layers (X) and at least two catalyst layers (Y) (which are different from each other) are employed, one layer (X) is placed on top of said at least two catalyst layers (Y), one layer (X) is placed as interlayer between two different catalyst layers (Y), and a third layer (X) is placed below said at least two lower catalyst layer (Y). Another suitable catalyst bed arrangement is shown in FIG. I. The weight ratio of each catalyst layer (X) to each catalyst layer (Y) is generally in the range of from about 1:100 to about 1:1, preferably from about 1:20 to about 1:5.

The dimensions of catalyst bed layer (X) comprising the substantially spherical alumina-containing particles obtained by the above-described heating process are not considered critical and depend on the dimension of the hydrotreating reactor that holds the fixed catalyst bed. Generally the height of each layer (X) ranges from about 1 to about 50 feet in commercial hydrotreating operations. It is within the scope of this invention to have additionally inert particles present (up to 50 weight-%) in layer (X), such as shaped inert ceramic particles. The height of each catalyst layer (Y) can vary widely, depending on the particular reactor dimensions.

If desired, the fixed catalyst bed of this invention can be sulfided by treatment with a fluid stream that contains sulfur compounds, generally prior to said hydrotreating process. Non-limiting examples of such fluid streams are solutions of mercaptans, of mercaptoalcohols, of organic sulfides or of organic disulfides in a suitable organic solvent (such as gas oil and other petroleum fractions), and gas streams that comprise $H_2S$, such as mixtures of $H_2$ and $H_2S$. This sulfiding procedure is generally carried out at an elevated temperature (preferably at about 400°–700° F.) for a period of time sufficient (preferably from about 0.5–20 hours) so as to convert at least a portion of compounds of one or more metals contained in particles of layer (Y), and optionally also in particles of layer (X), to sulfides of said one or more metals.

In general, the fixed catalyst bed of this invention is utilized primarily for demetallization and desulfurization. The time in which the fixed catalyst bed of this invention will maintain its activity for the above process will depend upon the hydrotreating conditions and the composition of the hydrocarbon-containing feed. Generally, the temperature of the hydrotreating process is gradually increased to compensate for loss of catalyst activity due to fouling (e.g., due to deposition of coke and metals as the catalyst). The entire fixed catalyst bed or one or more layers of the fixed catalyst bed can, if desired, be regenerated when the catalytic activity has dropped below a desired level. Catalyst regeneration can be carried in-situ by discontinuing the flow of hydrogen and of the hydrocarbon-containing feed streams, purging the fixed bed reactor with an inert gas (e.g., $N_2$) and then heating the fixed catalyst bed in a free oxygen-containing gas atmosphere (such as air), under such conditions as to remove carbonaceous materials and to at least partially convert sulfides of transition metals such as Mo, Co and/or Ni back to their oxides and/or phosphates. Preferably, however, the fixed bed layers are removed from the cooled hydrotreating reactor after said purging and are transferred to another reactor where the catalyst regeneration takes place. Generally the catalyst regeneration step is carried out at about 400°–600° C. and at a pressure of about 0–1,000 psig.

The following examples are presented in further illustration of the invention and are not to be considered as unduly limiting the scope of this invention.

Example I

This example illustrates the preparation of various promoted alumina-containing materials, useful as catalyst for hydrogenation and hydrotreating processes.

Catalyst 1 (Control) was prepared by mixing 20 grams of spherical alumina (diameter 1–2 mm, BET/$N_2$ surface area: 130 $m^2$/g; pore volume, as determined by mercury intrusion porosimetry: 1.0 cc/g; supplied by Alcoa Chemicals Division of Aluminum Company of America, Pittsburg, PA) with about 22 g of an aqueous impregnating solution containing 2.94 g citric acid, 2.94 g $(NH_4)_6Mo_7O_{24} \cdot 4H_2O$, $Ni(NO_3)_2 \cdot 6H_2O$ and 0.79 g $Co(NO_3) \cdot 6H_2O$. The mixture of alumin impregnating solution was air-dried and then calcined at 800° F. for 3 hours. Catalyst 1 contained 0.7 weight-% Ni, 0.7 weight-% Co and 7.0 weight-% Mo.

Catalyst 2 (Control) was prepared by first soaking 26.5 g of spherical alumina (see above) with a pretreating solution containing 5 g $NH_4HSO_4$ in 100 cc deionized water, for about 3 minutes at room temperature. Excess pretreating solution was decanted. The thus pretreated alumina was dried, soaked with about 29 g of an impregnating solution containing 3.7 g citric acid, 3.7 g $(NH_4)_2Mo_7O_{24} \cdot 4H_2$ $Ni(NO_3)_2 \cdot 6H_2O$ and 1.0 g $Co(NO_3)_2 \cdot 6H_2O$, air-drie for 3 hours. Catalyst 2 contained 0.7 weight-% Ni, 0.7 weight-% Co and 7.0 weight-% Mo.

Catalyst 3 (Control) was prepared essentially in accordance with the method for making Catalyst 2, except that the pretreating solution contained 5 g $(NH_4)_2SO_4$ (in lieu of $NH_4HSO_4$) in 100 cc $H_2O$. Catalyst 3 contained 0.7 weight-% Ni, 0.7 weight-% Co and 7.0 weight-% Mo.

Catalyst 4 (Invention) was prepared essentially in accordance with the method for making Catalyst 2, except that the pretreating solution contained 5 g $(NH_4)_2S_2O_3$ (in lieu of $NH_4HSO_4$) in 100 cc $H_2O$. Catalyst 4 containing 0.7 weight-% Ni, 0.7 weight-% Co and 7.0 weight-% Mo.

Example II

This example illustrates the use of the catalyst compositions described in Example I in test runs for hydrogenating olefinic hydrocarbons.

A stainless steel reactor having a length of about 29 inches and an inner diameter of about 0.75 inch was filled with a top layer of 25 cc of low surface area α-alumina (14 mesh alundum; surface area less than 1 $m^2/g$), a middle layer of a mixture of 25 cc of alundum and 5 cc of one of the catalyst compositions described in Example I, and a bottom layer of 28 cc of alundum. Cyclohexene feed was introduced from the top into the reactor at a rate of 8-9 cc/hr, and hydrogen gas was introduced from the top at a rate of 200 cc/min. The total pressure was about 150 psig at reaction conditions. The temperature of the reactor was then slowly increased to the desired reaction temperature of about 150°-250° C. Samples of the product were taken at various time intervals (generally every hour) and analyzed for cyclohexene and cyclohexane content by means of a gas chromatograph. Average conversion results of last runs at three reaction temperatures generally lasting about 25 hours are summarized in Table I. Essentially the entire formed product was cyclohexane.

TABLE I

| Catalyst | % Conversion of Cyclohexene | | |
|---|---|---|---|
| | at 150° C. | at 200° C. | at 250° C. |
| 1 (Control) | 81 | 80 | 98 |
| 2 (Control) | 69 | 68 | 91 |
| 3 (Control) | 46 | 78 | 97 |
| 4 (Invention) | 97 | 94 | 99 |

Date in Table I clearly show that, unexpectedly, Invention Catalyst 4, wherein the alumina support had been pretreated with ammonium thiosulfate, $(NH_4)_2S_2O_3$, was a considerably more active olefin hydrogenation catalyst than Control Catalyst 1 (no pretreatment of alumina support), Control Catalyst 2 (the alumina support of which had been pretreated with $NH_4HSO_4$) and Control Catalyst 3 (the alumina support of which had been pretreated with $(NH_4)_2SO_4$).

Example III

In this example, the automated experimental setup for investigating the hydrofining of heavy oils in accordance with the present invention is described. Oil was pumped downward through an induction tube into a trickle bed reactor. 28.5 inches long and 0.75 inches in diameter. The oil pump used was a reciprocating pump with a diaphragm-sealed head. The oil induction tube extended into a catalyst bed (located about 3.5 inches below the reactor top) comprising a top layer of about 25 cc of low surface area α-alumina (14 mesh alundum; surface area less than 1 $m^2$/gram), a middle layer of 13 cc (6.9 g) of one of the hydrofining catalysts described in Example I mixed with 57 cc of 36 mesh alundum, and a bottom layer of about 15 cc of alundum.

The heavy oil feed was a mixture of 50 volume-% 400 F+ Hondo residium and 50 volume-% light cycle oil. The feed contained about 3.1 weight-% sulfur, 54 ppmw (parts per million by weight) nickel and 124 ppmw vanadium.

Hydrogen was introduced into the reactor through a tube that concentrically surrounded the oil induction tube but extended only to the reactor top. The reactor was heated with a 3-zone furnace. The reactor temperature was measured in the catalyst bed at three different locations by three separate thermocouples embedded in axial thermocouple well (0.25 inch outer diameter). The liquid product oil was collected every day for analysis. The hydrogen gas was vented. Vanadium and nickel contents were determined by plasma emission analysis and the sulfur content was measured by X-ray fluorescence spectrometry.

Example IV

This example illustrates the removal of metals (Ni, V) and sulfur from the heavy oil feed (see Example III) by hydrotreatment in the presence of Catalysts 1-4. Pertinent process conditions were: LHSV of about 1.0 cc oil/cc catalyst/hr; hydrogen flow rate of about 2500 per cubic feet $H_2$ per barrel oil; reaction pressure of about 2250 psig; and reaction temperature of about 700° F. Catalysts 1-4 had been presulfided (before the hydrotreating tests) by heating in a mixture of $H_2$ and $H_2S$ ($H_2/H_2S$ volume ratio was 10:1.4) at about 400°-700° F. for about 8 hours. Pertinent hydrotreating test results are summarized in Table II.

TABLE II

| Catalyst | Days on Stream | Product Analysis | |
|---|---|---|---|
| | | Wt % S | ppmw (Ni + V) |
| 1 (Control) | 1 | 1.28 | 59.3 |
| | 2 | 1.55 | 71.7 |
| | 3 | 1.66 | 74.4 |
| | 4 | 1.93 | 88.5 |
| | Average | 1.6 | 74 |
| 2 (Control) | 1 | 1.51 | 74.4 |
| | 2 | 1.63 | 71.1 |
| | 3 | 1.70 | 84.4 |
| | 4 | 1.65 | 67.0 |
| | Average | 1.6 | 74 |
| 3 (Control) | 1 | 1.54 | 80.7 |
| | 2 | 1.81 | 88.1 |
| | 3 | 1.78 | 77.2 |
| | 4 | 1.91 | 84.2 |
| | Average | 1.8 | 83 |

TABLE II-continued

| Catalyst | Days on Stream | Product Analysis | |
|---|---|---|---|
| | | Wt % S | ppmw (Ni + V) |
| 4 | 1 | 1.21 | 61.9 |
| (Invention) | 2 | 1.15 | 52.3 |
| | 3 | 1.36 | 57.8 |
| | 4 | 1.47 | 61.5 |
| | Average | 1.3 | 58 |

Data in Table II clearly show that, unexpectedly, Invention Catalyst 4 (wherein alumina support had been pretreated with $(NH_4)_2S_2O_3$) was more effective in removing sulfur and metals from the oil feed than Control Catalyst 1 (no pretreatment of alumina support) and Control Catalysts 2 and 3 (wherein alumina had been pretreated with $NH_4HSO_4$ and $(NH_4)_2SO_4$, respectively).

Example V

This example illustrates the evaluation of catalyst bed support particles in oil hydrotreating tests, in the presence of steam. The purpose of this evaluation procedure is to determine the hydrodemetallization activity and the retention of crush strength of these support particles under severe hydrotreating conditions, in the presence of steam and sulfur compounds.

The catalyst bed arrangement (simulating proportions of a typical refinery bed loading) which was used in the evaluation tests is shown in FIG. 1. The catalyst bed column had a diameter of about 0.75 inches. Particles A were substantially spherical alumina-containing particles, which can be any of the particles A1 through A12 described in more detail in Example II. Material B was a commercial alumina-supported hydrotreating catalyst comprising 0.9 weight-% Co, 0.5 weight-% Ni and 7.5 weight-% Mo, havig a $BET/N_2$ surface area of 174 $m^2/g$ and a pore volume of 0.63 cc/g (measured by mercury intrusion porosimetry). Material C was a commercial alumina-based hydrotreating catalyst comprising 3.1 weight-% Ni, 7.9 weight-% Mo and 4.6 weight-% Ti having a BET/N surface area of 140 $m^2/g$ and a pore volume (by Hg intrusion porosimetry) of 0.5 cc/g. Material D was a commercial alumina-based hydrotreating catalyst comprising 2.4 weight-% Co and 6.7 weight-% Mo, having a $BET/N_2$ surface area of 290 $m^2/g$ and pore volume (by Hg intrusion porosimetry) of 0.47 cc/g.

A heavy-oil water mixture containing about 4-8 volume-% $H_2O$ was pumped to a metallic mixing T-pipe where it was mixed with a controlled amount of hydrogen gas. The heavy oil was a Maya 400F+ resid having an $API^{60}$ gravity of 14.0, containing 3.8 weight-% sulfur and about 350 ppmw (Ni+V) (parts by weight of Ni+V per million parts by weight of oil feed). The oil/water/hydrogen mixture was pumped downward through a stainless steel trickle bed reactor which contained the multi-layer catalyst bed described above (see FIG. 1). The tubular reactor was about 28.5 inches long, had an inner diameter of about 0.75 inches, and was fitted inside with a 0.25 inch O.D. axial thermocouple well. The reactor was heated by a 3-zone furnace. The reactor temperature was usually measured in four locations along the reactor bed by a traveling thermocouple that was moved within the axial thermocouple well.

Generally, the hydrotreating conditions were as follows: reaction temperature of about 690°-720° F.; liquid hourly space velocity (LHSV) of about 0.3 cc/cc catalyst/hour; about 2,250 psig total pressure; about 400 psig $H_2O$ (steam) partial pressure; time on stream: about 100-200 hours. When it was desired to determine the desulfurization and demetallization activity of the catalyst bed, the liquid product was filtered through a glass filter and analyzed for sulfur, nickel and vanadium by plasma emission analysis.

After completion of a hydrotreating test, the reactor with catalyst bed was flushed with xylene so as to remove undrained oil. Thereafter, nitrogen gas was passed through the xylene-washed catalyst bed so as to dry it. The various catalyst layers were carefully removed. Particles A, B or C were tested for crush strength in a Mechanic Force Gauge D-75M of Hunter Spring, Division of Ametek, Hot Field, PA. A single sphere of A or B or C, the average diameter of which had been measured, was placed between the metal plates of D-75M, and the plates were slowly moved toward one another by means of an electric motor. The force applied to the plates was displayed by a gauge. The force necessary to fracture (crush) a catalyst sphere was recorded as the crush strength of the sphere. The normalized crush strength, defined as crush strength of a sphere divided by its average particle diameter (lb/sphere/inch diameter), was calculated.

Example VI

This example illustrates the preparation of the substantially spherical alumina-containing particles of this invention and of other alumina-containing catalyst bed particles.

Control Particles A1 were spherical, Co/Mo-promoted alumina particles, marketed by Shell Chemical Company, Houston, TX under the product designation "Shell 544", suitable as support balls for hydrotreating catalyst beds. Pertinent properties of Particles A1 were: diameter of 1/6 inch; cobalt content of 1.7 weight-%; molybdenum content of 5.3 weight-%; surface area of 300+ $m^2/g$; total pore volume of 0.47 cc/g; loss on ignition (LOI; weight loss when heated to 482° C.) of 0.8 weight-%; compacted bulk density (compacted loading density) of about 0.83 g/cc; and side plate crush strength of 30+ lb/particle (i.e., about 190 lb/particle/inch diameter).

Control Particles A2 were substantially spherical, substantially unpromoted alumina-containing particles having an average particle diameter of ¼ inch; a $BET/N_2$ surface area of about 325 $m^2/g$; a total pore volume of about 0.50 $m^2/g$; and average normalized individual ball crush strength of about 240 lb/particle/inch diameter (i.e., the actual crush strength of a ¼" sphere was about 60 lb/particle); $Al_2O_3$ content of about 94.6 weight-%; $Na_2O$ content of about 0.35 weight-%; and LOI content (weight loss when heated from 250° C. to 1200° C.; a measure of hydroxyl content) of 5.0 weight-%. Particles A2 were supplied by Aluminum Company of America, Pittsburgh, PA under the product designation of S-100.

Control Particles A3 were obtained when Control Particles A2 were heated at about 650° C. for about one hour.

Control Particles A4 were obtained by soaking 100 grams of Control Particles A2 with an aqueous solution containing about 1.1 grams of ammonium heptamolybdate, $(NH_4)_6Mo_7O_{24}\cdot H_2O$ (provided by Alfa Products, Danvers, MA), dissolved in 100 cc of deionized water for about 20 minutes, as to provide a promoter level of about 0.3 weight-% Mo in the particles (after calcining); decanting excess solution; drying the thus impregnated particles at about 150° C. for about 2 hours, and then calcining them at about 650° C. for about 2 hours in air.

Control Particles A5 also contained about 0.3 weight-% Mo, and were obtained when 60 grams of Control Particles A2 were soaked in 100 cc of an aqueous solution containing about 1.1 grams of ammonium heptamolybdate and about 3.0 grams of ammonium bisulfate, NH4HSO4, for about 30 minutes, decanting excess solution, drying at about 150° C. for about 2 hours and calcining at about 650° C. for about 2 hours in air.

Control Particles A6 were prepared essentially in accordance with the preparation of Particles A5, except that (NH4)2SO4 (3.0 grams) was used in lieu of NH4HSO4.

Invention Particles A7 were prepared essentially in accordance with the preparation procedure for Particles A5, escept that (NH4)2S2O3 (3.0 grams) was used in lieu of NH4HSO4.

Invention Particles A8, A9, A10, A11 and A12 were prepared by soaking Control Particles A2 with an aqueous solution containing about 0.5 g, 1.0 g, 2.0 g, 4.0 g and 10.0 g, respectively, of (NH4)2S2O3 cc H2O (no Mo compound present) for about 30 minutes; decanting excess solution; drying the thus treated particles and calcining them at about 650° C. for about 2 hours in air. Particles A10 contained about 0.5 weight-% sulfur, Particles A11 contained about 0.7 weight-% sulfur and Particles A12 contained about 1.4 weight-% sulfur (determined after calcining).

Example VII

This example illustrates the effect of the impregnation of spherical alumina particles with various ammonium salts on the crush strength of the calcined particles.

In one test series, the average crush strength of Invention Particles A7 was compared with the average crush strength of Control Particles A4, A5 and A6, measured in accordance with the procedure described in Example V. Test results are summarized in Table III.

TABLE III

| Particles | NH4 Salts in Impregn. Solution | Wt % of NH4 Salt in Solution | Crush Strength (Lb/Particle) |
|---|---|---|---|
| A4 (Control) | None | 0 | 8.2 |
| A5 (Control) | NH4HSO4 | 3.0 | 8.3 |
| A6 (Control) | (NH4)2SO4 | 3.0 | 9.0 |
| A7 (Invention) | (NH4)2S2O3 | 3.0 | 12.9 |

Test data in Table III clearly demonstrate the significant improvement in crush strength (after hydrotreating in the presence of steam) of Invention Particles A7 (pretreated with (NH4)2S2O3) versus Control Particles A5 and A6 (pretreated with NH4HSO4 and (NH4)2SO4 respectively). Particles A4-7 all contained about 0.3 weight-% Mo.

Figure 2:
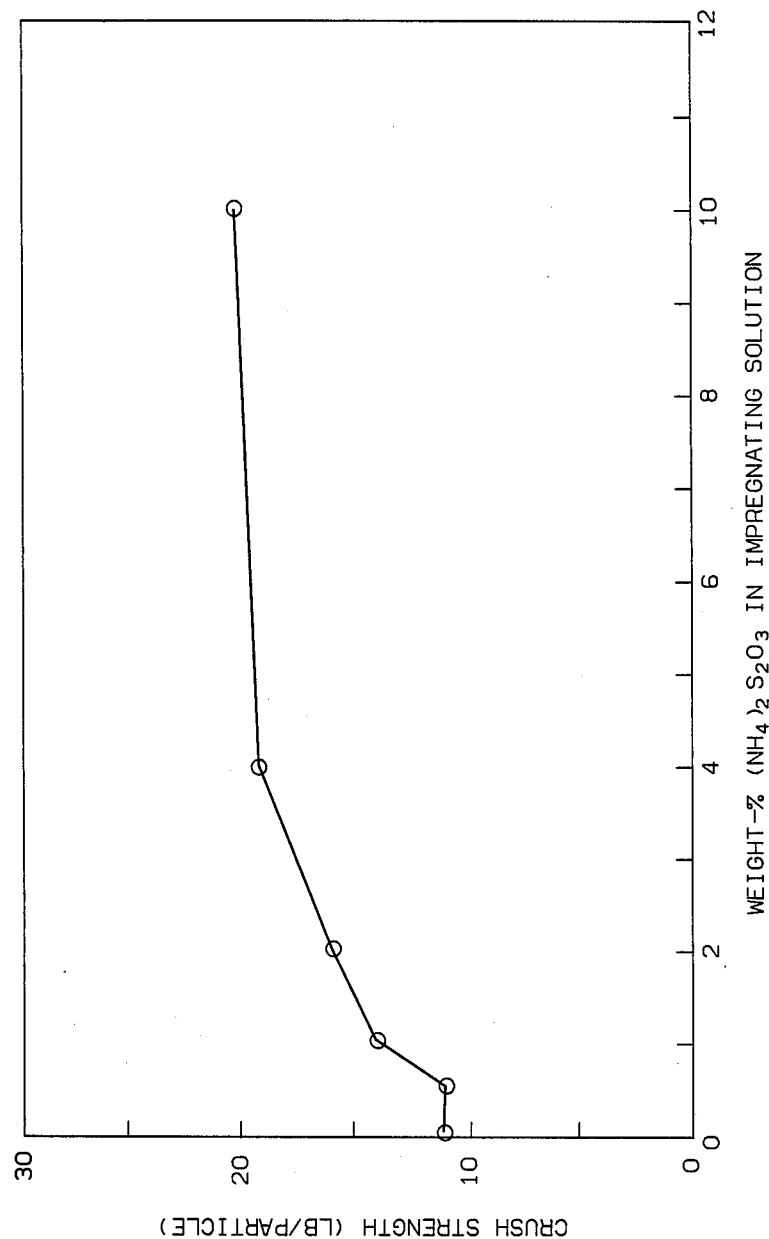
FIG. 2 is a graph showing the dependence of crush strength (determined after use in a hydrotreating test in the presence of steam) of impregnated alumina-containing particles on the $(NH_4)_2S_2O_3$ concentration in the impregnating solution.

In another test series, the effect of the concentration of (NH4)2S2O3 in the impregnating solution on the crush strength, determined in accordance with the procedure of Example V, of calcined Particles A8 through A12 was investigated. Test results are shown in FIG. 2. The crush strength of Particles A12 (treated with a 10 wt-% (NH4)2S2O3 solution) was about twice that of untreated Particles A2. Since analytical test results indicated that the calcined, (NH4)2S2O3-impregnated invention particles contained sulfur (see Example VI), it is believed that the incorporation of sulfate ions into the alumina structure of the spherical particles was responsible for the enhanced hydrothermal crush strength retention.

Example VIII

This example illustrates the effect of the heating (calcining) conditions on pertinent physical properties of alumina-containing spheres. A2 particles of about ⅛ inch diameter that had been impregnated with about 0.3 weight-% Mo were heated in air at temperatures ranging from 400° C. to 900° C. for about 1 hour (so as to prepare Particles A4). The crush strength of the thus calcined particles (diameter: ⅛ inch) was determined in accordance with the procedure described in Example V. Test results are summarized in Table IV and are plotted in FIG. 3.

TABLE IV

| Calcination Temp. (°C.) | Crush Strength (lb/Particle) | Normalized Crush Strength (lb/Inch Diameter) |
|---|---|---|
| 400 | 1.88 | 15.0 |
| 500 | 3.42 | 27.4 |
| 600 | 4.37 | 35.0 |
| 700 | 4.80 | 38.4 |
| 800 | 3.95 | 31.6 |
| 900 | 1.65 | 13.2 |

Figure 3:
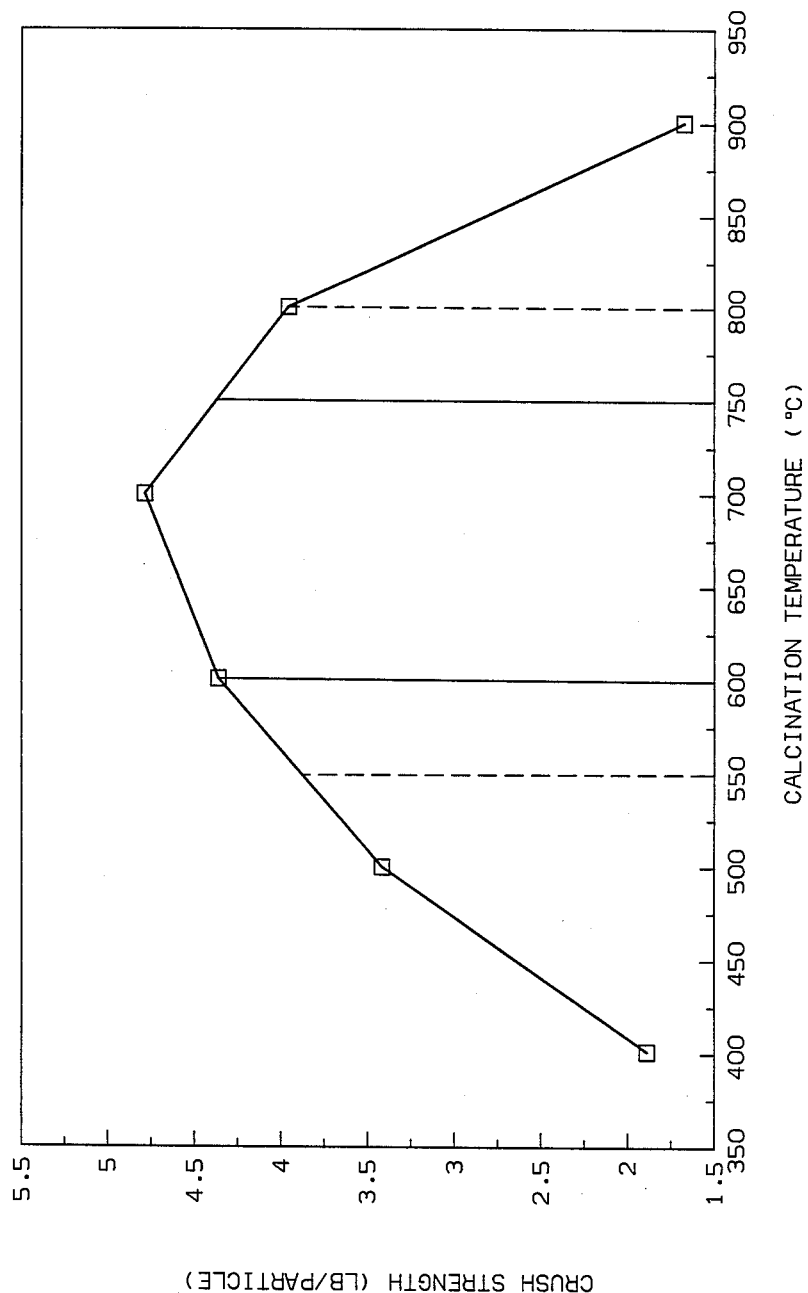
FIG. 3 is a graph showing the dependence of crush strength (determined after use in a hydrotreating test in the presence of steam) of alumina-containing particles on the calcination temperature.

Data in Table IV and FIG. 3 clearly show that maximum crush strength (after hydrotreating in the presence of steam) was attained when the alumina spheres (containing 0.3 weight-% Mo) were calcined at a temperature in the range of from about 550 to about 800° C., preferably from about 600 to about 750° C.

The effect of the calcination time, at a calcination temperature of 650° C., is shown in Table V.

TABLE V

| Calcination Time (minutes) | Crush Strength (lb/Particle) | Crush Strength (lb/Inch Diameter) |
|---|---|---|
| 20 | 7.01 | 56.1 |
| 40 | 7.25 | 58.0 |
| 60 | 7.20 | 57.6 |
| 90 | 6.68 | 53.4 |
| 120 | 6.41 | 51.3 |
| 240 | 5.22 | 41.8 |

Data in Table V show that a calcination time of about 20-90 minutes was suitable for ⅛ inch diameter alumina-containing Particles A4. Prolonged calcining had a detrimental effect.

Based on the above-described test results, it is concluded that the preferred heating conditions in step (A) for preparing the (NH4)2S2O3-impregnated, substantially spherical alumina-containing particles of this invention (such as Particles A1 through A12) will also comprise a temperature of about 550°-800° C. (more preferably about 600°-750° C.) and a heating time of about 20-90 minutes.

Example IX

Figure 4:
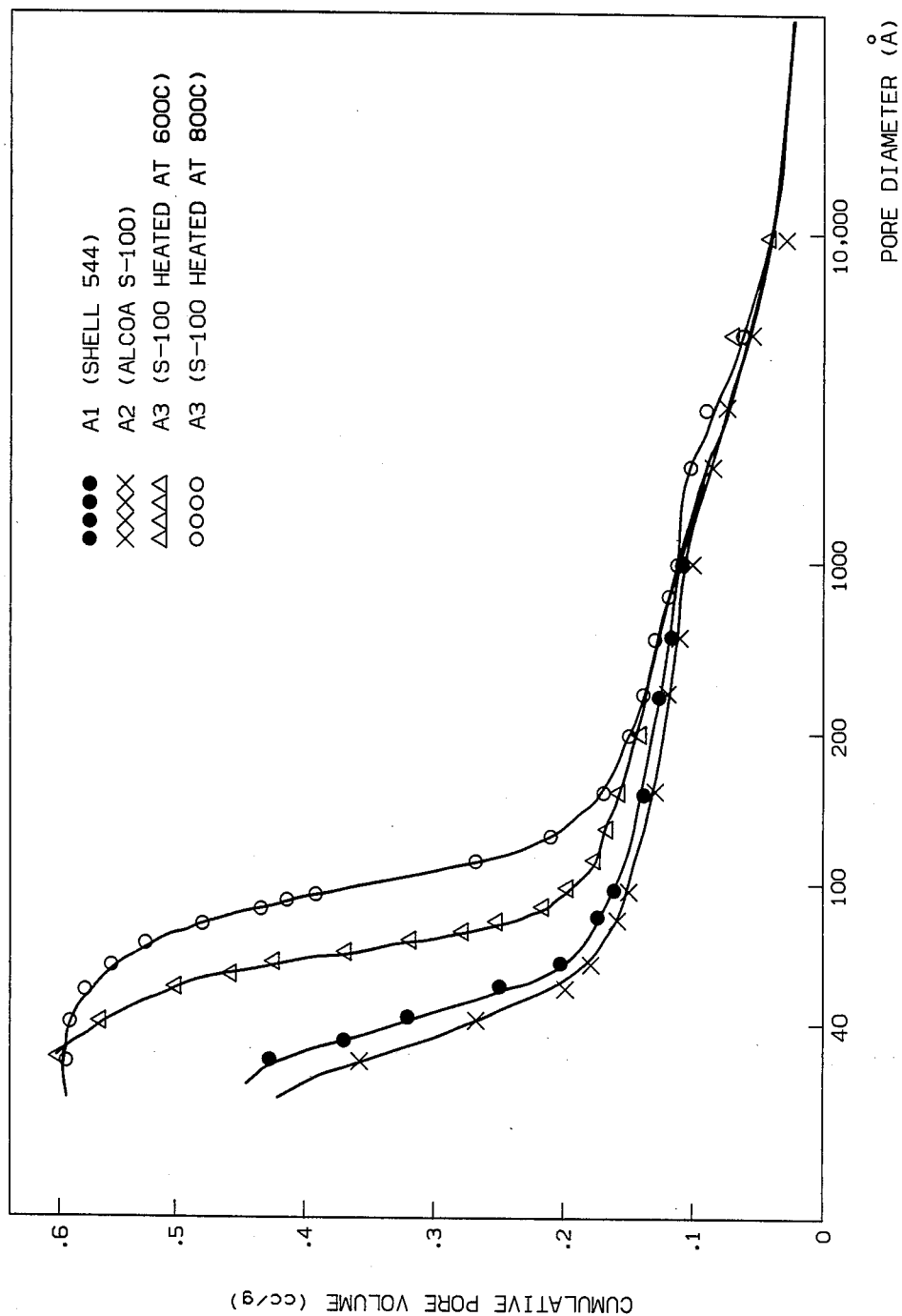
FIG. 4 exhibits pore distribution curves for several alumina-containing particles.

The effect of the calcination temperature of the pore volume distribution of Particles A1, A2 and A3 was investigated. Pore volume and pore diameter of these particles were determined by measuring intrusion porosimetry (carried out at room temperature at a mercury ranging from 0 psi to 60,000 psi, using an Autopore 9200 instrument of Micromeritics, Norcross, GA). In FIG. 4, pore volume was plotted versus logarithm of pore diamter for A1, A2 and two A3 samples. FIG. 4 shows that A1 (Shell 544, as received; 1/6" diameter) and of A2 (Alcoa S-100, as received; 1/16" diameter) had very similar pore distributions, whereas the pore distributions of the two A3 samples (obtained by heating 1/16" A2 particles at 600° C. and 800° C., respectively, for about 3 hours), differed significantly from those of A1 and A2. The most significant changes that resulted when A2 (S-100) particles were heated to 600° C. and 800° C., respectively, (so as to make A3 particles), was a shift toward a substantially greater portion of pores in the 40-200A pore diameter range. About 80% of the total pore volume of A3 was in pores of the 40-200 Angstrom range, whereas the percentage of the total pore volume of A1 and A2 in the 40-200 Angstrom pore diameter range was only about 40%.

Based on the above-described test results, it is concluded that heating at 600°-800° C. in step (A) for preparing the $(NH_4)_2S_2O_3$-impregnated, substantially spherical alumina-containing particles of this invention will have a very similar effect in the pore volume distribution of the particles of this invention (such as Particles A7 through A12) as the above-described effect on the pore volume distribution of Particles A3.

The total pore volume of the Mo-impregnated alumina spheres A3 ranged from about 0.5 to about 0.6 cc/g when the calcination was carried out for 16 hours at a temperature in the range of from about 400° C. to about 800° C. Thus, the effect of the calcination temperature on the total pore volume of calcined spheres A3 was rather insignificant. Based on these results, it is concluded that the total pore volume of the $(NH_4)_2S_2O_3$-impregnated, substantially spherical alumina-containing particles of this invention (such as Particles A7 through A12) will also vary only insignificantly with the calcination temperature.

Example X

This example illustrates the improved performance of Particles A4 (with 0.3 weight-% Mo) in prolonged hydrotreating tests versus Particles A1 and A2. Crush strength results, obtained substantially in accordance with the hydrotreating procedure described in Example I, are summarized in Table III. Hydrotreating conditions were: 2200 psig total pressure; 760° F.; 110 psi steam pressure, LHSV of 0.1 cc/cc catalyst/hour. The resid feed contained about 2.0 weight-% sulfur and about 60 ppmw (Ni+V).

TABLE VI

| Particles[1] | Hours on Stream: | | | | | |
|---|---|---|---|---|---|---|
| | 0 | 16 | 30 | 140 | 270 | 360 |
| | Crush Strength (lb/Particle) | | | | | |
| 1/6" A1 | 35 | 11 | N/A | N/A | N/A | N/A |
| ⅛" A2 | 58 | 11 | N/A | N/A | N/A | N/A |
| ⅛" A4 | 55 | 39 | 37 | 34 | 38 | 38 |
| ⅛" A4 | 100+ | 80+ | 80+ | 80+ | 80+ | 80+ |
| ⅛" B | 49 | N/A | 42 | N/A | N/A | N/A |

[1]Fractions indicate particle diameter expressed in inches.

Test data in Table VI clearly show a significant improvement in crush strength retention of Particles A4 over commercial Particles A1 and A2, after use in the several hydrotreating runs in the presence of steam, as described in Example V. Based on these results and based on the fact that the $(NH_4)_2S_2O_3$-impregnated, substantially spherical alumina-containing Particles A7 through A12 of this invention have a higher crush strength retention than Particles A4 (see Table III and specifically FIG. 2), it is concluded that the $(NH_4)_2S_2O_3$-impregnated, substantially spherical alumina-containing particles of this invention will also be superior to Particles A1 and A2, in terms of crush strength retention.

Reasonable variations and modifications are possible within the scope of the disclosure and appended claims.

That which is claimed is:

1. A process for preparing a composition of matter comprising the steps of
   (A) impregnating a support material comprising alumina with a solution comprising water and at least one dissolved thiosulfate compound;
   (B) heating the material obtained in step (A) under such conditions as to at least partially dry said material obtained in step (A);
   (C) impregnating the at least partially dried material obtained in step (B) with a solution comprising a liquid solvent and at least one dissolved compound of at least one metal selected from the group consisting of transition metals belonging to Group VB, Group VIB, Group VIIB, Group VIII and Group IB of the Periodic Table of Elements;
   (D) heating the material obtained in step (C) at a first temperature so as to at least partially dry said material obtained in step (C); and
   (E) heating the at least partially dried material obtained in step (D) at a second temperature, which is higher than said first temperature, so as to activate said at least partially dried material obtained in step (D).

2. A process in accordancd with claim 1 wherein said thiosulfate compound used in step (A) is $(NH_4)_2S_2O_3$.

3. A process in accordance with claim 2 wherein the concentration of $(NH_4)_2S_2O_3$ in the solution used in step (A) is in the range of from about 1 to about 200 grams per liter.

4. A process in accordance with claim 3 wherein the weight ratio of said support material to said solution used in step (A) is in the range of from about 1:20 to about 5:1.

5. A process in accordance with claim 1 wherein said support material used in step (A) has a surface area, determined by ASTM method D3037, of about 20 to about 350 m$^2$/g, and a pore volume, measured by mercury intrusion porosimetry, of about 0.2 to about 2.0 cc/g.

6. A process in accordance with claim 5 wherein said support material consists essentially of alumina.

7. A process in accordance with claim 1 wherein heating steps (B) and (D) are carried out at a temperature of about 40 to about 300° C., and heating step (E) is carried out at a temperature of about 300° C. to about 700° C.

8. A process in accordance with claim 1 wherein said liquid solvent of the solution used in step (C) is water, the concentration of said at least one dissolved compound of at least one metal is in the range of from about 0.01 to about 5.0 mol/l, and the weight ratio of said at least partially dried material obtained in step (B) to said solution used in step (C) is in the range of from about 1:100 to about 10:1.

9. A process in accordance with claim 1 wherein said at least one metal in said at least one dissolved compound used in step (C) is selected from the group consisting of Mo, Ni and Co, and the weight percentage of said at least one metal in the activated material obtained in step (E) is in the range of from about 0.1 to about 25 weight-%.

10. A process in accordance with claim 1 further comprising the step of
   (F) contacting the activated material obtained in step (D) with at least one suitable sulfur containing compound under such conditions as to at least partially convert transition metal compounds contained in said activated material to transition metal sulfides.

11. A composition of matter prepared by the process comprising the steps of
   (A) impregnating a support material comprising alumina with a solution comprising water and at least one dissolved thiosulfate compound;
   (B) heating the material obtained in step (A) under such conditions as to at least partially dry said material obtained in step (A);
   (C) impregnating the at least partially dried material obtained in step (B) with a solution comprising a liquid solvent and at least one dissolved compound of at least one metal selected from the group consisting of transition metals belonging to Group VB, Group VIB, Group VIIB, Group VIII and Group IB of the Periodic Table of Elements;
   (D) heating the material obtained in step (C) at a first temperature so as to at least partially dry said material obtained in step (C); and
   (E) heating the at least partially dried material obtained in step (D) at a second temperature, which is higher than said first temperature, so as to activate said at least partially dried material obtained in step (D).

12. A composition of matter in accordance with claim 11 wherein said thiosulfate compound used in step (A) is $(NH_4)_2S_2O_3$.

13. A composition of matter in accordance with claim 12 wherein the concentration of $(NH_4)_2S_2O_3$ in the solution used in step (A) is in the range of from about 1 to about 200 grams per liter.

14. A composition of matter in accordance with claim 13 wherein the weight ratio of said support material to said solution used in step (A) is in the range of from about 1:20 to about 5:1.

15. A composition of matter in accordance with claim 11 wherein said support material used in step (A) has a surface area, determined by the ASTM method D3037, of about 20 to about 350 $m^2/g$, and a pore volume, measured by mercury intrusion porosimetry, of about 0.2 to about 2.0 cc/g.

16. A composition of matter in accordance with claim 15 wherein said support material consists essentially of alumina.

17. A composition of matter in accordance with claim 11 wherein heating steps (B) and (D) are carried out at a temperature of about 40 to about 300° C., and heating step (E) is carried out at a temperature of about 300° C. to about 700° C.

18. A composition of matter in accordance with claim 11 wherein said liquid solvent of the solution used in step (C) is water, the concentration of said at least one dissolved compound of at least one metal is in the range of from about 0.01 to about 5.0 mol/l, and the weight ratio of said at least partially dried material obtained in step (B) to said solution used in step (C) is in the range of from about 1:100 to about 10:1.

19. A composition of matter in accordance with claim 11 wherein said at least one metal in said at least one dissolved compound used in step (C) is selected from the group consisting of Mo, Ni and Co, and the weight percentage of said at least one metal in the activated material obtained in step (E) is in the range of from about 0.1 to about 25 weight-%.

20. A composition of matter in accordance with claim 11 wherein said process further comprises the step of
   (F) contacting the activated material obtained in step (D) with at least one suitable sulfur containing compound under such conditions as to at least partially convert transition metal compounds contained in said activated material to transition metal sulfides.

21. A composition of matter comprising impregnated, substantially spherical alumina-containing particles, having been prepared by the process comprising the steps of
   (a) impregnating (i) a starting material of substantially spherical alumina-containing particles which have an initial average particle diameter of at least about 0.05 inch, an initial surface area, as determined by the BET method employing nitrogen, of at least 20 $m^2/g$, an initial pore volume, as determined by mercury intrusion porosimetry, of at least about 0.1 cc/g, and an initial content of $Al_2O_3$ of at least about 80 weight-%, with (ii) a solution consisting essentially of water, at least one dissolved compound of at least one element selected from the group consisting of molybdenum, cobalt and nickel, and dissolved ammonium thiosulfate; and
   (b) heating the material obtained in step (a) at a temperature in the range of from about 500 to about 900° C. for a period of time of at least 10 minutes, under such heating conditions as to obtain a material having a higher crush strength than said starting material, wherein said crush strength is measured after exposure of each of said materials for about 100 hours to a liquid hydrocarbon-containing stream which contains at least about 0.5 weight-% sulfur, under hydrotreating conditions at about 2250 psig total pressure, about 400 psig partial pressure of steam and about 700° F.

22. A composition of matter in accordance with claim 21 wherein said starting material used in step (a) has an initial average particle size in the range of from about 0.1 to about 1.0 inch, an initial surface area in the range of from about 40 to about 600 $m^2/g$, an initial pore volume in the range of from about 0.2 to about 1.0 cc/g, and an initial normalized crush strength in the range of from about 100 to about 400 lb. per inch diameter per particle.

23. A composition of matter in accordance with claim 21 wherein the initial content of Na in said starting material is below about 2.0 weight-%, and said initial content of $Al_2O_3$ in said starting material is in the range of from about 90 to about 99 weight-%.

24. A composition of matter in accordance with claim 31 wherein the concentration of dissolved ammonium thiosulfate in the impregnating solution used in step (a) is in the range of from about 0.05 to about 5 mol/l, and the weight ratio of said starting material to said impregnating solution is in the range of from about 0.1:1 to about 2.01:1.

25. A composition of matter in accordance with claim 24 wherein said concentration of dissolved ammonium thiosulfate is in the range of from about 0.1 to about 1.0 mol/l.

26. A composition of matter in accordance with claim 21 wherein said heating in step (b) is carried out at a temperature in the range of from about 550 to about 800° C. for a period of time in the range of from about 10 minutes to about 20 hours.

27. A composition of matter in accordance with claim 21 wherein said impregnated, substantially spherical alumina-containing particles obtained in step (b) have a pore volume of pores possessing a diameter of about 40–200 Angstroms in the range of from 50% to about 90% of the total pore volume, and a normalized crush strength in the range of from about 150 to about 350 lb. per inch diameter per particle.

28. A composition of matter in accordance with claim 21 wherein said impregnated, substantially spherical alumina-containing particles obtained in step (b) have a surface area in the range of from about 50 to about 300 $m^2/g$ and a pore volume in the range of from about 0.3 to about 0.8 cc/g.

29. A composition in accordance with claim 21 comprising said at least one element at a level of from about 0.01 to about 3.0 weight-%.

30. A composition of matter in accordance with claim 29 wherein said at least one element is molybdenum and is present at a level of from about 0.1 to about 2.0 weight-% Mo.

31. A composition of matter in accordance with claim 21 wherein said impregnated, substantially spherical alumina-containing particles are contained in at least one layer (X) of a fixed hydrotreating catalyst bed.

32. A composition of matter in accordance with claim 31 additionally comprising at least one layer (Y) of catalyst particles comprising a refractory inorganic carrier and at least one hydrogenation promoter selected from the group consisting of transition metals belonging to Groups IIIB, IVB, VB, VIB, VIIB, VIII, IB and IIB of the Periodic Table and compounds of said transition metals.

33. A composition of matter in accordance with claim 32 wherein said refractory inorganic carrier comprises alumina, and said at least on hydrogenation promoter is selected from the group consisting of compounds of Y, La, Ce, Ti, Zr, Cr, Mo, W, Mn, Re, Ni, Co and Cu.

34. A composition of matter in accordance with claim 32 wherein a layer (X) of said impregnated, substantially spherical alumina-containing particles is placed below at least one layer (Y) of said catalyst particles.

35. A composition of matter in accordance with claim 32 wherein a layer (X) of said impregnated, substantially spherical alumina-containing particles is placed on top of at least one layer (Y) of said catalyst particles.

36. A composition of matter in accordance with claim 32 wherein the weight ratio of each layer (X) of said impregnated, substantially spherical alumina-containing particles to each layer (Y) of said catalyst particles is in the range of from about 1:100 to about 1:1.

37. A composition of matter comprising impregnated, substantially spherical alumina-containing particles having been prepared by the process comprising the steps of (a) impregnating (i) a starting material of substantially spherical alumina-containing particles which have an initial average particle diameter of at least about 0.05 inch, an initial surface area, as determined by the BET method employing nitrogen, of at least 20 $m^2/g$, an initial pore volume, as determined by mercury intrusion porosimetry, of at least about 0.1 cc/g, and an initial content of $Al_2O_3$ of at least about 80 weight-%, with (ii) a solution consisting essentially of water and dissolved ammonium thiosulfate; and (b) heating the material obtained in step (a) at a temperature in the range of from about 500 to about 900° C. for a period of time of at least 10 minutes, under such heating conditions as to obtain a material having a higher crush strength than said starting material, wherein said crush strength is measured after exposure of each of said materials for about 100 hours to a liquid hydrocarbon-containing stream which contains at least about 0.5 weight-% sulfur, under hydrotreating conditions at about 2250 psig total pressure, about 400 psig partial pressure of steam and about 700° F.

38. A composition of matter in accordance with claim 37 wherein said starting material used in step (a) has an initial average particle size in the range of from about 0.1 to about 1.0 inch, an initial surface area of from about 40 to about 600 $m^2/g$, and initial pore volume in the range of from about 0.2 to about 1.0 cc/g, an an initial normalized crush strength in the range of from about 100 to about 400 lb. per inch diameter per particle.

39. A composition of matter in accordance with claim 37 wherein the initial content of Na in said starting material is below about 2.0 weight-%, and said initial content of $Al_2O_3$ in said starting material is in the range of from about 90 to about 99 weight-%.

40. A composition of matter in accordance with claim 37 wherein the concentration of dissolved ammonium thiosulfate in the impregnating solution used in step (a) is in the range of from about 0.05 to about 5 mol/l, and the weight ratio of said starting material to said impregnating solution is in the range of from about 0.1:1 to about 2.01:1.

41. A composition of matter in accordance with claim 40 wherein said concentration of dissolved ammonium thiosulfate is in the range of from about 0.1 to about 1.0 mol/l.

42. A composition of matter in accordance with claim 37 wherein said impregnated, substantially spherical alumina-containing particles obtained in step (b) have a pore volume of pores possessing a diameter of about 40–200 Angstroms in the range of from 50% to about 90% of the total pore volume, and a normalized crush strength in the range of from about 150 to about 350 lb. per inch diameter per particle.

43. A composition of matter in accordance with claim 37 wherein said impregnated, substantially spherical alumina-containing particles obtained in step (b) have a surface area in the range of from about 50 to about 300 $m^2/g$ and a pore volume in the range of from about 0.3 to about 0.8 cc/g.

44. A composition of matter in accordance with claim 37 wherein said impregnated, substantially spherical alumina-containing particles are contained in at least one layer (X) of a fixed hydrotreating catalyst bed.

45. A composition of matter in accordance with claim 44 additionally comprising at least one layer (Y) of catalyst particles comprising a refractory inorganic carrier and at least one hydrogenation promoter selected from the group consisting of transition metals belonging to Groups IIIB, IVB, VB, VIB, VIIB, VIII, IB and IIB of the Periodic Table and compounds of said transition metals.

46. A composition of matter in accordance with claim 45 wherein said refractory inorganic carrier comprises alumina, and said at least one hydrogenation promoter is selected from the group consisting of compounds of Y, La, Ce, Ti, Zr, Cr, Mo, W, Mn, Re, Ni, Co and Cu.

47. A composition of matter in accordance with claim 45 wherein a layer (X) of said impregnated, substantially spherical alumina-containing particles is placed below at least one layer (Y) of said catalyst particles.

48. A composition of matter in accordance with claim 45 wherein a layer (X) of said impregnated, substantially spherical alumina-containing particles is placed on top of at least one layer (Y) of said catalyst particles.

49. A composition of matter in accordance with claim 45 wherein the weight ratio of each layer (X) of said impregnated, substantially spherical alumina-containing particles to each layer (Y) of said catalyst particles is in the range of from about 1:100 to about 1:1.

* * * * *